United States Patent
Colpan et al.

(10) Patent No.: US 8,596,295 B2
(45) Date of Patent: Dec. 3, 2013

(54) MECHANICAL POSITION INDICATOR

(75) Inventors: Umit Jon Colpan, Allentown, PA (US); Robert Peter Jackson, Nazareth, PA (US)

(73) Assignee: Mueller International, LLC, Atlanta, GA (US)

(\*) Notice: Subject to any disclaimer, the term of this patent is extended or adjusted under 35 U.S.C. 154(b) by 155 days.

(21) Appl. No.: 13/161,461

(22) Filed: Jun. 15, 2011

(65) Prior Publication Data

US 2011/0308646 A1    Dec. 22, 2011

Related U.S. Application Data

(60) Provisional application No. 61/355,333, filed on Jun. 16, 2010.

(51) Int. Cl.
*F16K 37/00* (2006.01)
*E03B 7/07* (2006.01)
*F17D 3/00* (2006.01)
*G01P 13/00* (2006.01)
*H01H 35/40* (2006.01)

(52) U.S. Cl.
USPC .... 137/556.3; 137/552; 137/554; 200/81.9 R; 116/277

(58) Field of Classification Search
USPC ............. 137/556.3, 553, 557, 552, 554; 200/81.9 R; 116/271, 273, 274, 277
See application file for complete search history.

(56) References Cited

U.S. PATENT DOCUMENTS

| | | | | |
|---|---|---|---|---|
| 3,254,660 A | * | 6/1966 | Ray | 137/66 |
| 6,152,173 A | * | 11/2000 | Makowan | 137/556.3 |
| 7,533,693 B2 | * | 5/2009 | Colton et al. | 137/556.3 |
| 2008/0061769 A1 | * | 3/2008 | Junk et al. | 324/207.22 |

\* cited by examiner

*Primary Examiner* — John Rivell
*Assistant Examiner* — Michael R Reid
(74) *Attorney, Agent, or Firm* — Taylor English Duma LLP

(57) ABSTRACT

A check valve position indicator assembly is disclosed including an indicator housing, an indicator shaft rotatably disposed in the indicator housing, an indicator arm attached to the shaft, a rod attached to the shaft, a mounting bracket, an indicia member attached to the mounting bracket, and at least one fastener attaching the indicator housing with the mounting bracket. In some embodiments, a seal is included along the bottom of the indicator housing.

17 Claims, 8 Drawing Sheets

MECHANICAL POSITION INDICATOR

CROSS-REFERENCE TO RELATED APPLICATION

This application claims the benefit of U.S. Provisional Application No. 61/355,333 filed on Jun. 16, 2010, which is hereby incorporated by reference herein in its entirety.

TECHNICAL FIELD

The presently disclosed subject matter is related to valve position indicators for use with flex check valves.

BACKGROUND

A flex check valve uses a flexible closure to prevent reverse flow in valves. The flexible closure typically is a disc that is hinged internally allowing no external indication of the position of the mechanism. Since the closure is totally internal, there is no reliable way to see potential problems without some indication of the position of the valve disc. If the valve were to remain closed with a pump running with no flow, costly damage to the pump or the piping system may ensue. Some previous indicators have used an electric signal indicator or an indicator relying on a tension spring with a threaded plug. Some previous indicators are not easily aligned, or, if capable of alignment, are not easily sealable. For example, some previous indicators must be rotatably aligned. However, many of these indicators are connected to the flex check valve by threaded connection. This arrangement means that a full engagement of the threads cannot be made, and a proper seal cannot be effected by threading except in the unlikely event that the indicator is aligned when the threads are fully-engaged. As such, some attempts to address this problem introduces thread seal tape to attempt to effect a seal. However, thread seal tape can degrade over time and requires proper initial installation. Additionally, some prior indicators include biasing members that are disposed outside of their assemblies, meaning the biasing members may be damaged, removed, or tampered with easily. Further, if a limit switch is included in the assembly, many prior indicators require effort to align the limit switch.

SUMMARY

In one embodiment, an exemplary and non-limiting check valve position indicator assembly for a flex check valve disposed within a valve body is disclosed. The assembly includes a rod, an indicator arm, a rotatable shaft, a torsion spring, and a valve position indicia member which may be the indicator arm. The rod is positioned within the valve body so that the first end of the rod moves when the flex valve moves. The indicator arm is positioned outside the valve body. The shaft connects the rod to the indicator arm so that the movement of the rod is translated by the shaft to a rotational motion on the indicator arm, and the indicator shows whether the flex check valve is open or closed as determined by the position of the indicator arm.

In another exemplary and non-limiting embodiment, a method of determining the position of a flex check valve is disclosed. The method includes positioning a rod of predetermined length within the valve body that moves when the flex valve moves, connecting the rod to an indicator arm positioned outside of the valve body through a shaft so that the movement of the rod is translated to rotational movement of the indicator arm, and determining the position of the flex check valve based upon a position of the indicator arm. The length of the rod is selected based on the distance between the shaft and the flex valve.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION OF ILLUSTRATIVE EMBODIMENTS

The present subject matter may be understood more readily by reference to the following detailed description taken in connection with the accompanying figures and examples, which form a part of this disclosure. It is to be understood that this subject matter is not limited to the specific devices, methods, applications, conditions or parameters described and/or shown herein, and that the terminology used herein is for the purpose of describing particular embodiments by way of example only and is not intended to be limiting of the claimed subject matter.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Figure 1:
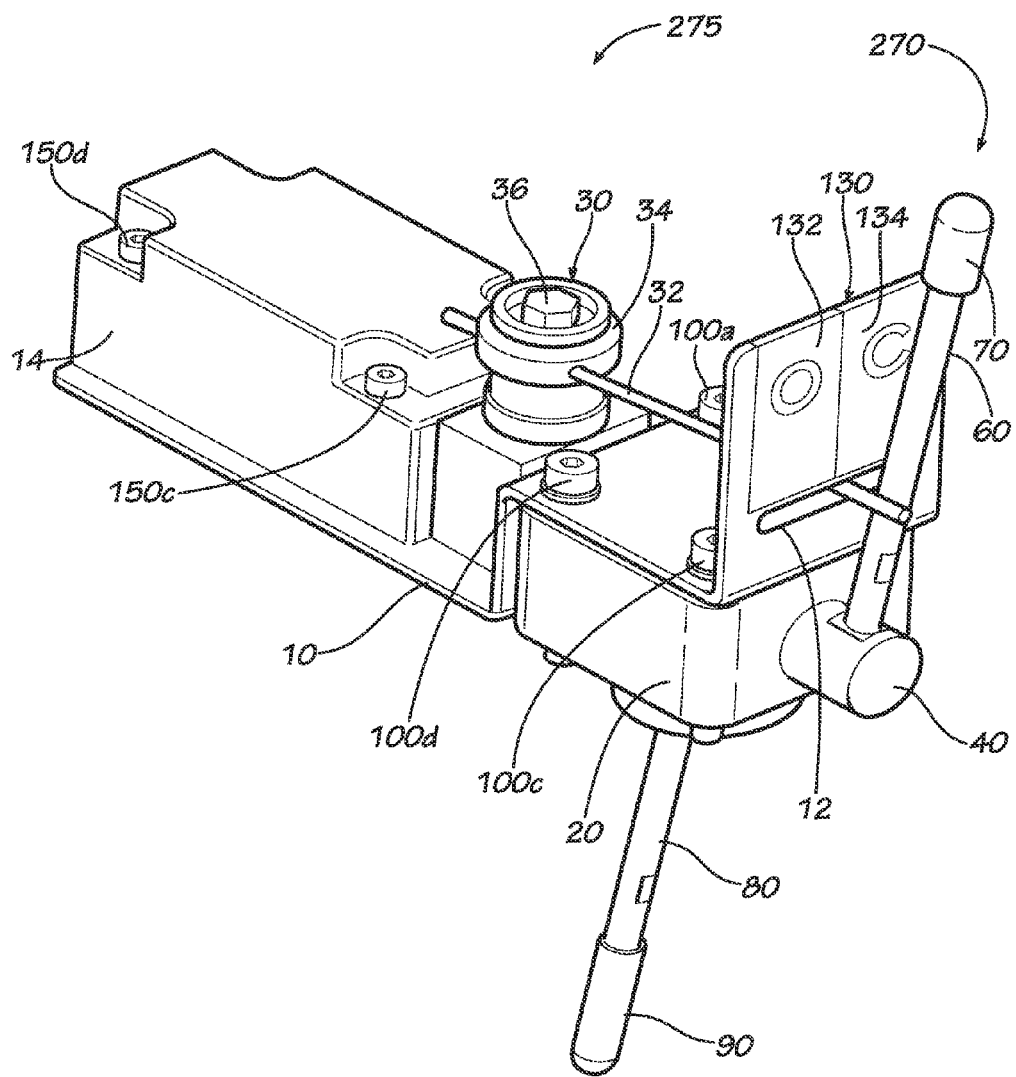
FIG. 1 is an isometric view of an assembly of a position indicator in accord with one embodiment of the current disclosure, the assembly including an electro-mechanical limit switch.

As seen in FIG. 1, a valve indicator assembly 270 includes a mounting bracket 10 to which an indicator housing 20 is mounted using through-bore bolts 100a,b,c,d. The valve indicator assembly 270 includes a rod 80 of predetermined length attached to an indicator shaft 40, and a rod end 90 is attached to an engagement end of the rod 80 in the current embodiment, although other embodiments may exclude the rod end 90. The valve indicator assembly 270 also includes an indicator arm 60 secured to the indicator shaft 40, and an arm end 70 may be attached to the indicator arm 60. An indicia member 130 is attached to the mounting bracket 10 and includes an open indicator 132, depicted as an "O" in the current embodiment, and a closed indicator 134, depicted as a "C" in the current embodiment. The indicia member 130 covers both sides of the mounting bracket 10, in one embodiment. The mounting bracket 10 defines a limit slot 12 through which an arm 32 of a limit switch 14 is inserted. The limit switch 14 may not be included in all embodiments of the current disclosure. The limit switch 14 is an electro-mechanical limit switch and includes a rotating delimiter 30 which is connected to the limit switch 14 using a bolt 36. A biased bobbin 34 rotates about the bolt 36 and includes the arm 32 connected to the bobbin 34. The limit switch is connected to the mounting bracket 10 by through-bore bolts 150a,b,c,d. The through-bore bolts 150a,b,c,d are bolted into nuts 152a,b,c,d (shown in FIG. 3). Washers may be included between the nuts 152a,b,c,d and the mounting bracket 10 in some embodiments.

Figure 2:
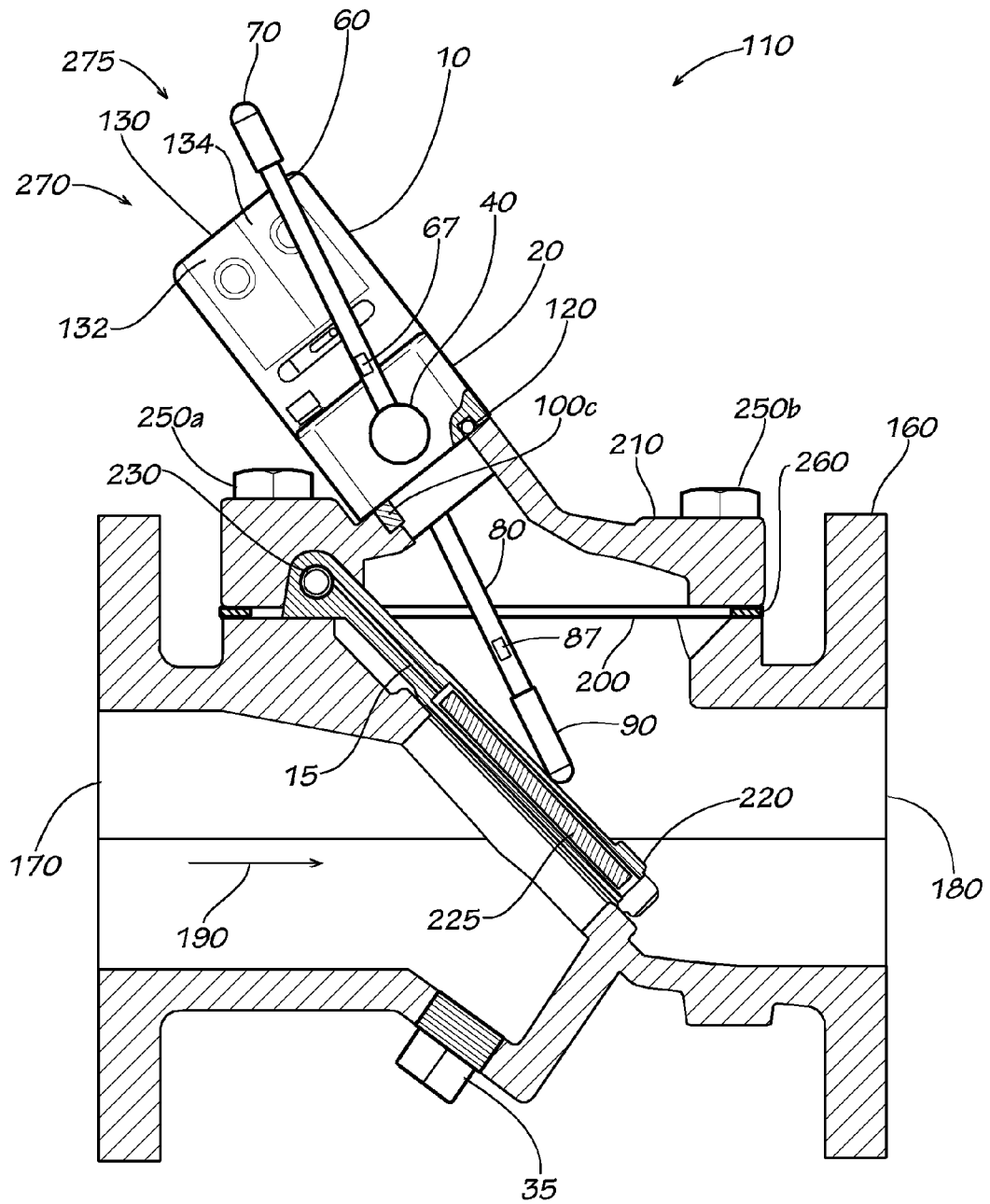
FIG. 2 is a partial sectional view showing a fully assembled valve with the position indicator installed on the flex check valve.

Referring to FIG. 2, an embodiment of a position indicator valve 110 including the valve indicator assembly 270 is illustrated. The position indicator valve 110 includes a valve body 160 having an inlet 170, an outlet 180, and a top opening 200. The position indicator valve 110 also includes the valve indicator assembly 270, a cover 210, and a flexible disc 220. The flexible disc 220 includes a reinforcing member 225 and a biasing element 15. The desired media flow path is indicated by the flow arrow 190. The flexible disc 220 is pivotally secured between the valve body 160 and the cover 210 at valve pivot 230. The cover 210 is secured to the valve body 160 using valve bolts 250a,b, although any number of valve bolts 250 may be used. A gasket 260 seals the connection of the cover 210 to the valve body 160. An access plug 35 is also shown.

The valve indicator assembly 270 includes the indicator housing 20 attached to the cover 210. As shown in the view of FIG. 2, the through-bore bolts 100a,b,c,d (100c shown in view) connect the valve indicator assembly 270 to the cover 210 through threaded engagement inside threaded bores (not shown) in cover 210. An O ring 120 may be provided between the indicator housing 20 and cover 210 to provide a fluid tight seal between the cover 210 and the indicator housing 20. When the through-bore bolts 100a,b,c,d are tightened into the cover 210, the compression seats the O ring 120 and effects a seal. The valve indicator assembly 270 also includes the indicator shaft 40 disposed in the indicator housing 20 in a way that it can freely rotate along the longitudinal axis of the indicator shaft 40. The valve indicator assembly 270 also includes a rod 80 of predetermined length attached to the indicator shaft 40 and disposed so that it extends through the top opening 200 into the interior portion of the valve body 160. The rod 80 is attached to the indicator shaft 40 in a removable fashion such as by threading into a threaded opening, although other connections are considered within this disclosure. The rod 80 includes a flat portion 87 which allows application of force by a wrench to attach the rod 80. Similarly, the indicator arm 60 includes a flat portion 67.

The rod end 90 is shown attached to the rod 80 so as to provide contact with the flexible disc 220. The rod 80 and the rod end 90 may be of different lengths to enable the valve indicator assembly 270 to be used with a range of valve sizes. Typical valve sizes may vary from 2 inches to 24 inches. The combined length of the rod 80 and the rod end 90 should be substantially equal to the distance between the indicator shaft 40 and the center of the flexible disc 220. The length is substantially equal to the distance between the indicator shaft 40 and the center of the flexible disc 220 if the rod end 90 is in contact with the flexible disc 220 when the valve indicator assembly 270 is secured to the valve body 160. The valve indicator assembly 270 also includes the indicator arm 60 having the indicator end 70 and secured to the indicator shaft 40. When the indicator shaft 40 rotates, the indicator arm 60 is displaced. The indicia member 130 is shown secured to the mounting bracket 10 adjacent to the indicator arm 60 in a way that the position of the flexible disc 220 is indicated by the indicator arm 60, as the indicator arm 60 points either to the open indicator 132 or to the closed indicator 134. An electronic valve indicator assembly 275 may include the electro-mechanical limit switch 14 with the valve indicator assembly 270.

Figure 3:
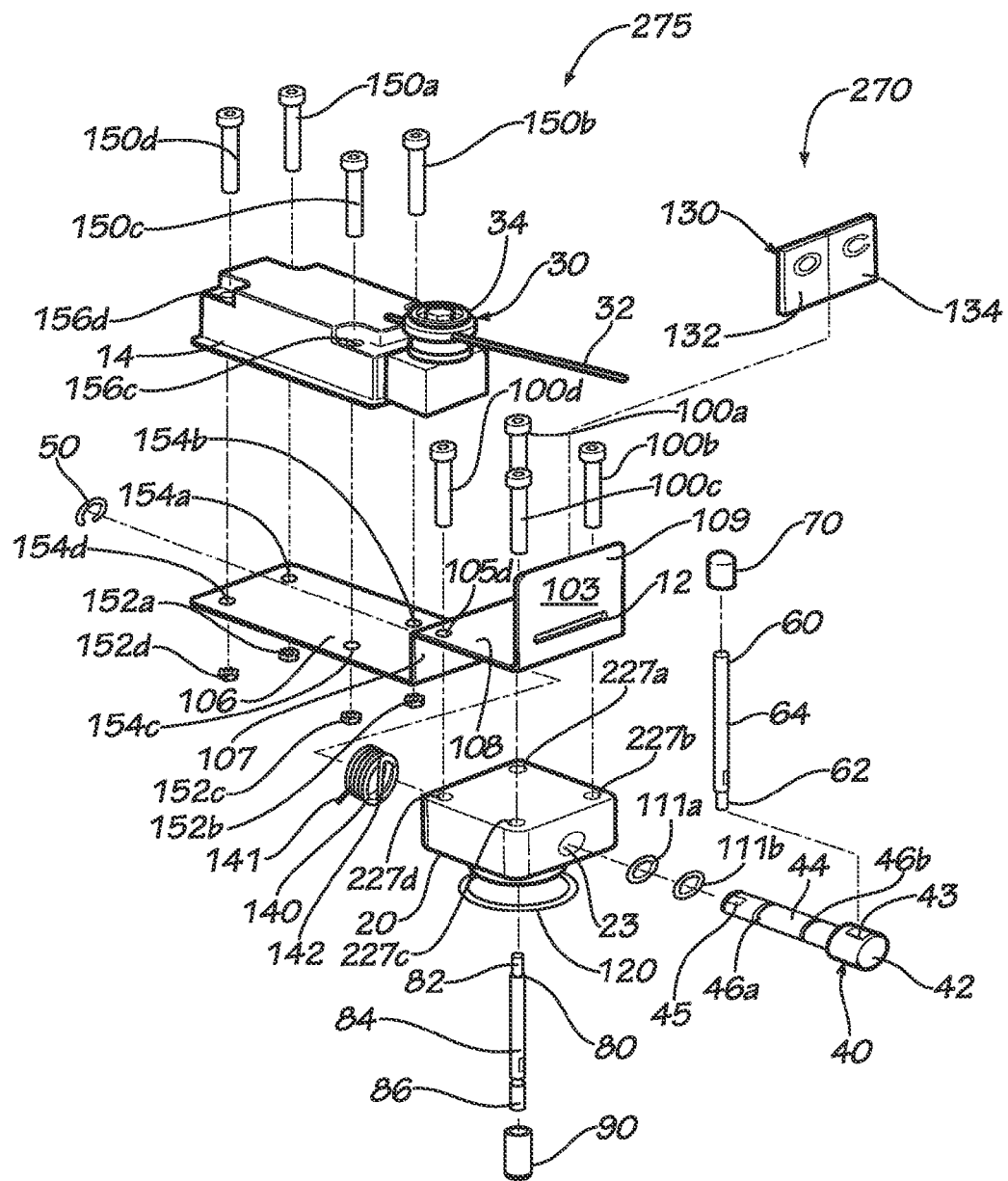
FIG. 3 is an exploded view of the components of a position indicator of the current disclosure, including an electro-mechanical limit switch.
Figure 4:
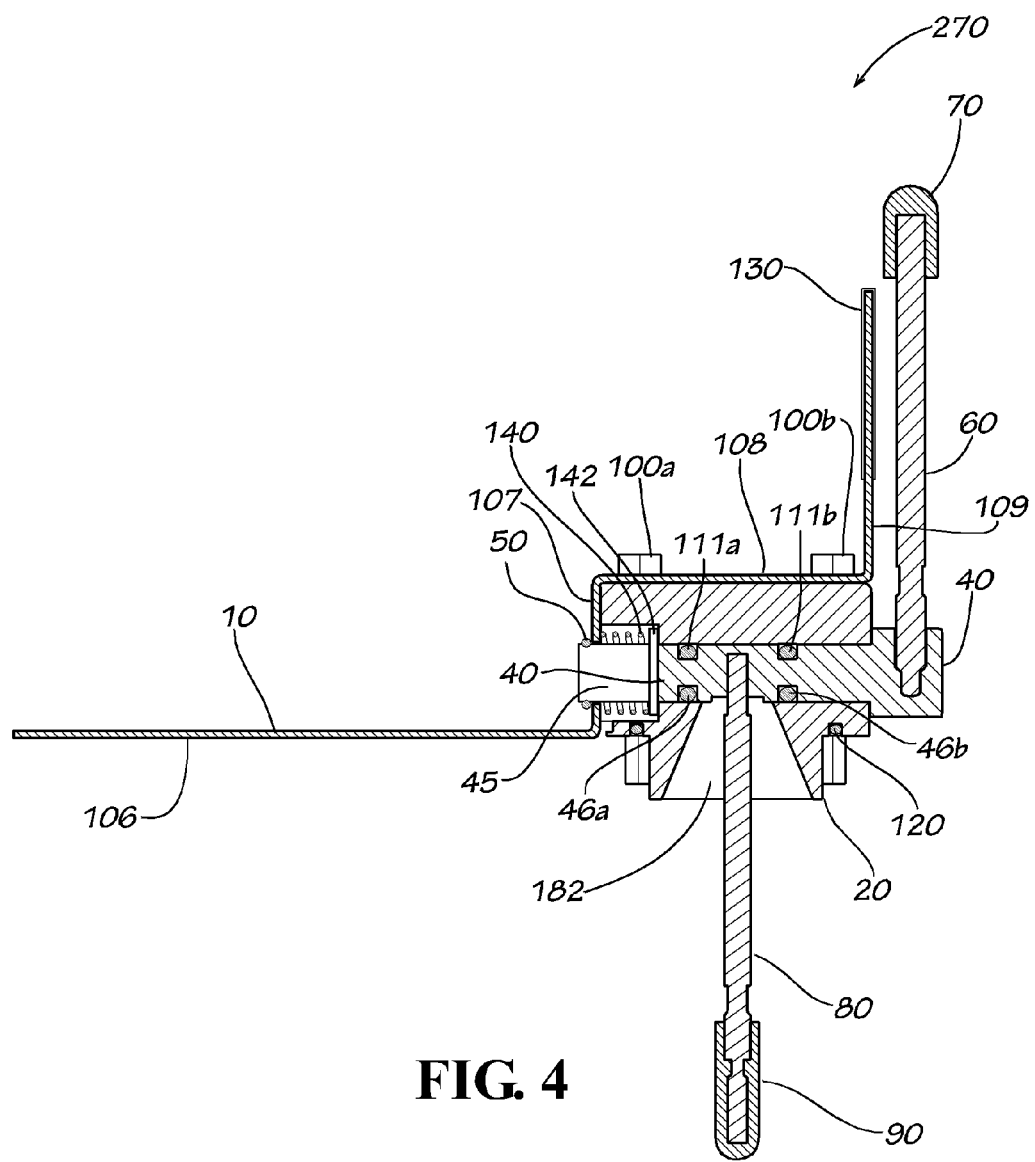
FIG. 4 is a sectional view of a position indicator of the current disclosure.

Referring now to FIGS. 3 and 4, the indicator shaft 40 is inserted into a rotation bore 23 in the indicator housing 20. The indicator shaft 40 is secured to the indicator housing 20 with a snap ring 50. O-rings 111a,b are provided to seal the indicator shaft 40 to the indicator housing 20. The indicator shaft 40 includes a head portion 42 and a shank portion 44. The O-rings 111a,b seat in gasket indentions 46a,b located in the shank portion 44 of the indicator shaft 40. A bias mating slot 45 is located in the end of the shank portion 44. A torsion spring 140 is secured by a shaft mating lead 142 to the indicator shaft 40 and by a housing mating lead 141 to the indicator housing 20 in a way so as to provide a torque to indicator shaft 40.

Through-bore bolts 150a,b,c,d are shown exploded away from through-bores 156a,b,c,d in the limit switch 14. The through-bore bolts 150a,b,c,d pass through the through-bores 156a,b,c,d of the limit switch 14, pass through-bores 154a,b,c,d of the mounting bracket 10, and secure to nuts 152a,b,c,d, holding the limit switch 14 secure to the mounting bracket 10.

As can be seen, the mounting bracket 10 includes a limit switch portion 106, a rise portion 107, a housing attachment portion 108, and an indicator portion 109. The indicator portion 109 includes an indicator portion surface 103. The limit slot 12 is located in the indicator portion 109.

The rod 80 includes a shaft attachment portion 82 that is threaded, a rod portion 84, and an end attachment portion 86 on the engagement end that is also threaded for attachment of the rod end 90. Similarly, the indicator arm 60 includes a shaft attachment portion 62 that is threaded and an arm portion 64. The arm end 70 is placed over the top of the arm portion 64. The indicator arm 60 is connected to the indicator shaft 40 by screwing the shaft attachment portion 62 into an attachment bore 43 in the indicator shaft 40.

As stated earlier with reference to prior FIGs., the through-bore bolts 100a,b,c,d connect to the valve body 160 (shown in FIG. 2) by passing through bracket bores 105a,b,c,d (only 105d shown in FIG. 3) in the housing attachment portion 108 and then through-bores 227a,b,c,d in the indicator housing 20, thereby seating the O ring 120 against the valve body 160 (shown in FIG. 2). Although the current disclosure cites through-bore bolts, any type of fastener may be used, including nails, regular bolts, screws, and snaps, among others. In addition, although a multiplicity of through-bore bolts are disclosed, any number of fasteners may be used so long as the fasteners provide sufficient fastening force. A cone relief 182 provides freedom for the rod 80 to move when the indicator shaft 40 rotates. The rise portion 107 retains the torsion spring 140 and provides a shoulder against which the snap ring 50 can hold the indicator shaft 40.

The operation of the position indicator valve 110 may be illustrated with an example where the torsion spring 140 maintains the rod end 90 on flexible disc 220 in a closed position. When fluid flow through the inlet 170 displaces the flexible disc 220 to the open position, the rod 80 is displaced causing the indicator shaft 40 to rotate relative to the fixed indicator housing 20. The rotation of the indicator shaft 40 displaces the indicator arm 60 relative to the indicia member 130 thereby indicating that the valve is open.

Because of the alignment of through-bore bolts 150a,b,c,d with through-bores 156a,b,c,d and pass through-bores 154a,b,c,d, the limit switch 14 is placed onto the mounting bracket 10 in a set alignment. Additionally, because of the alignment of through-bore bolts 100a,b,c,d with the bracket bores 105a,b,c,d and the through-bores 227a,b,c,d, the indicator assembly 270 is held in a set alignment. Thus, the indicator assembly 270 and the limit switch 14 are aligned based on the configuration of the mounting bracket 10.

Figure 5:
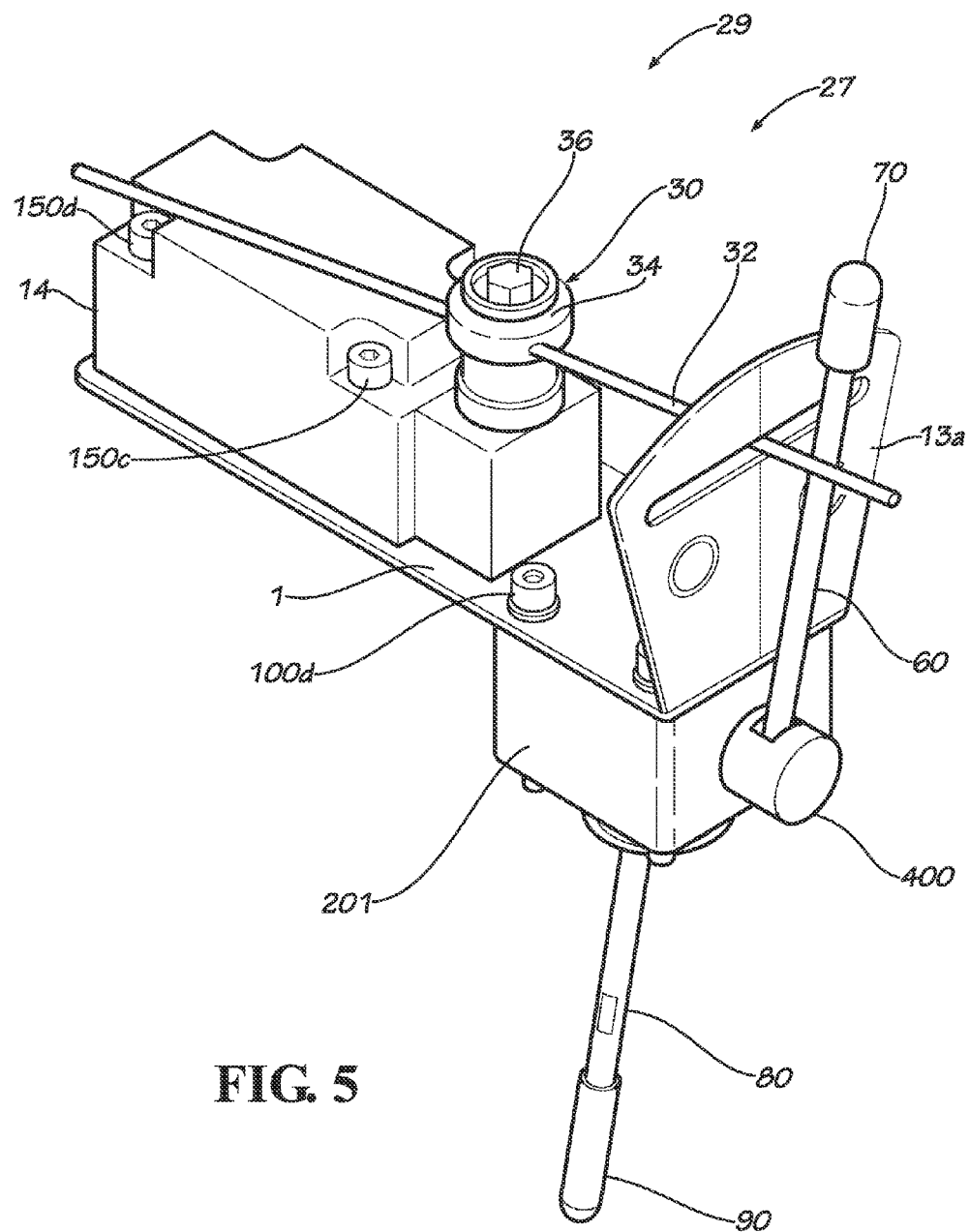
FIG. 5 is an isometric view of an assembly of a position indicator in accord with one embodiment of the current disclosure, the assembly including an electro-mechanical limit switch.

In another embodiment of the current disclosure as seen in FIG. 5, a valve indicator assembly 27 includes a mounting bracket 1, an indicator housing 201, an indicator shaft 400, the indicator arm 60, the arm end 70, the rod 80, and the rod end 90. The indicator housing 201 is connected to the mounting bracket 1 using through-bore screws 100a,b,c,d. A front indicia member 13a is shown. A back indicia member 13b is not shown but is included. Optionally connected to the mounting bracket 1 is the limit switch 14 which includes the rotating delimiter 30 having a biased bobbin 34 rotating about the bolt 36 and attached to the arm 32. The limit switch 14 is connected to the mounting bracket 1 by through-bore bolts 150a,b,c,d secured by nuts 152a,b,c,d (shown in FIG. 7). An electronic valve indicator assembly 29 may include the limit switch 14 with the valve indicator assembly 27.

Figure 6:
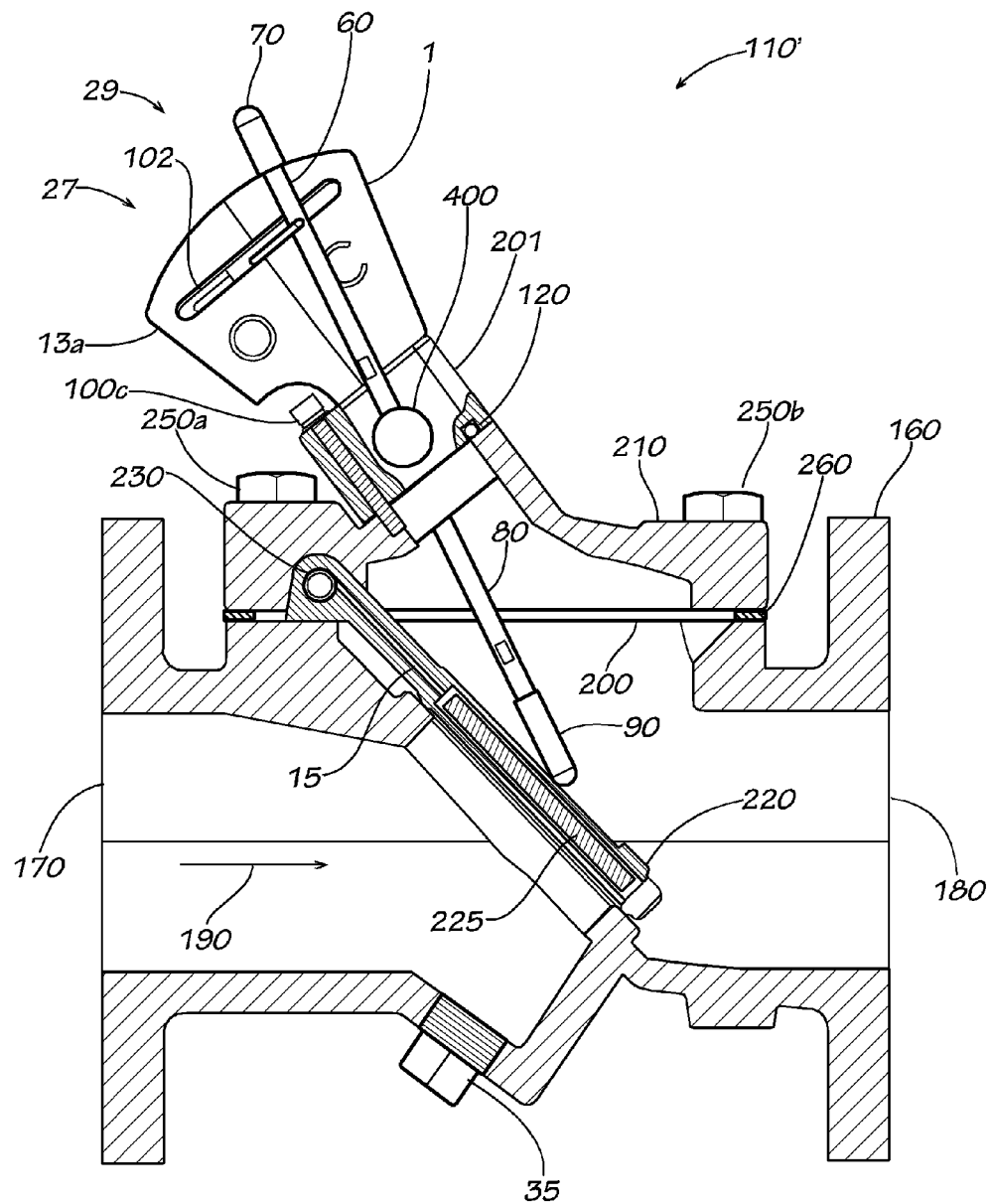
FIG. 6 is a partial sectional view showing a fully assembled valve with the position indicator installed on the flex check valve.

Turning to FIG. 6, a position indicator valve 110' includes the valve indicator assembly 27 connected to the valve body 160 using the through-bore screws 100a,b,c,d. A cross-sectional view showing the interaction of the through-bore screw 100c is shown in FIG. 6. A limit slot 102 is included in mounting bracket 1. It is placed proximate the top of the mounting bracket 1. As can be seen, the front indicia member 13a flares from bottom to top so that the top is wider than the bottom of the front indicia member 13a. This allows the limit slot 102 be wide if desired.

Figure 7:
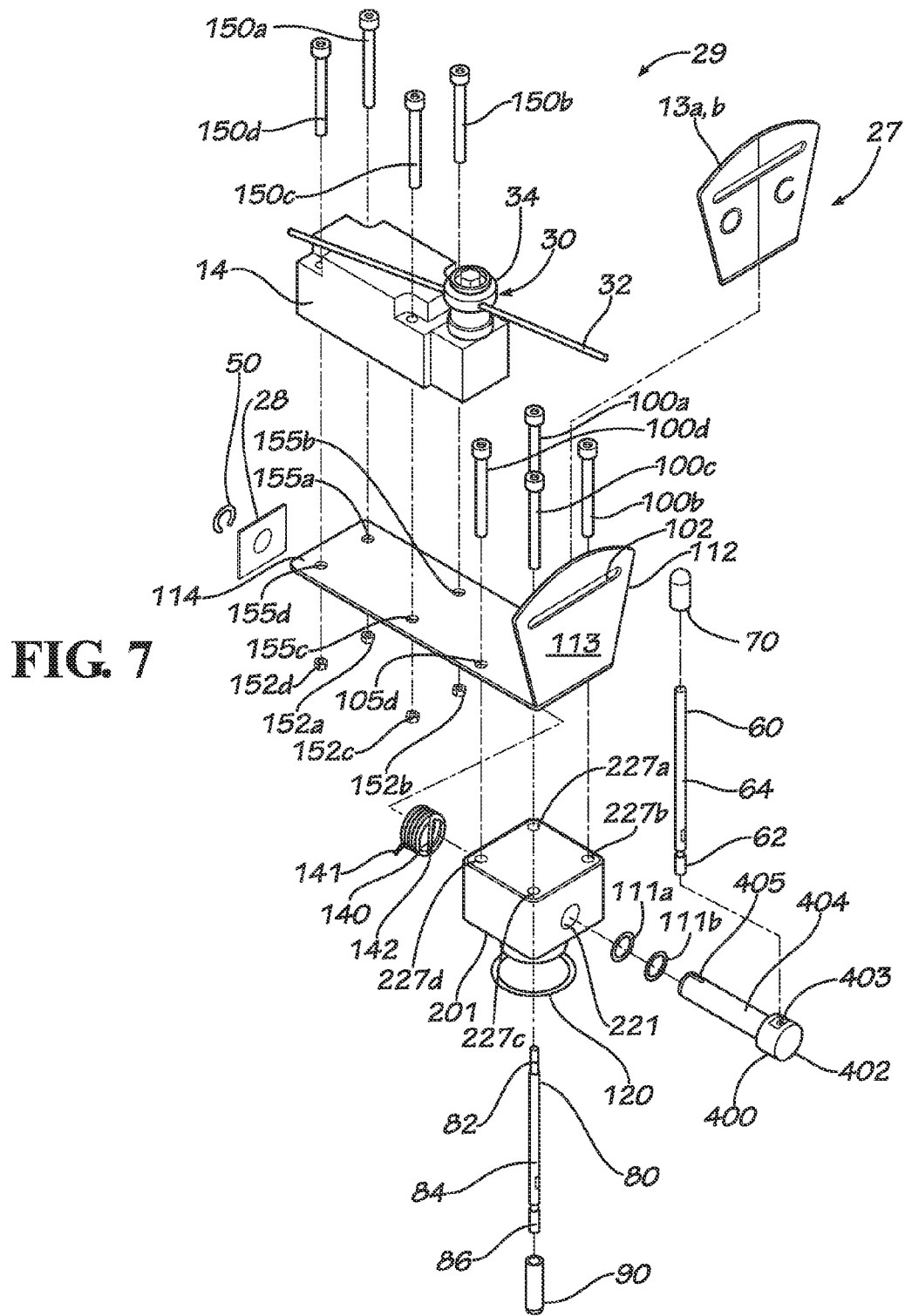
FIG. 7 is an exploded view of the components of a position indicator of the current disclosure, including an electro-mechanical limit switch.
Figure 8:
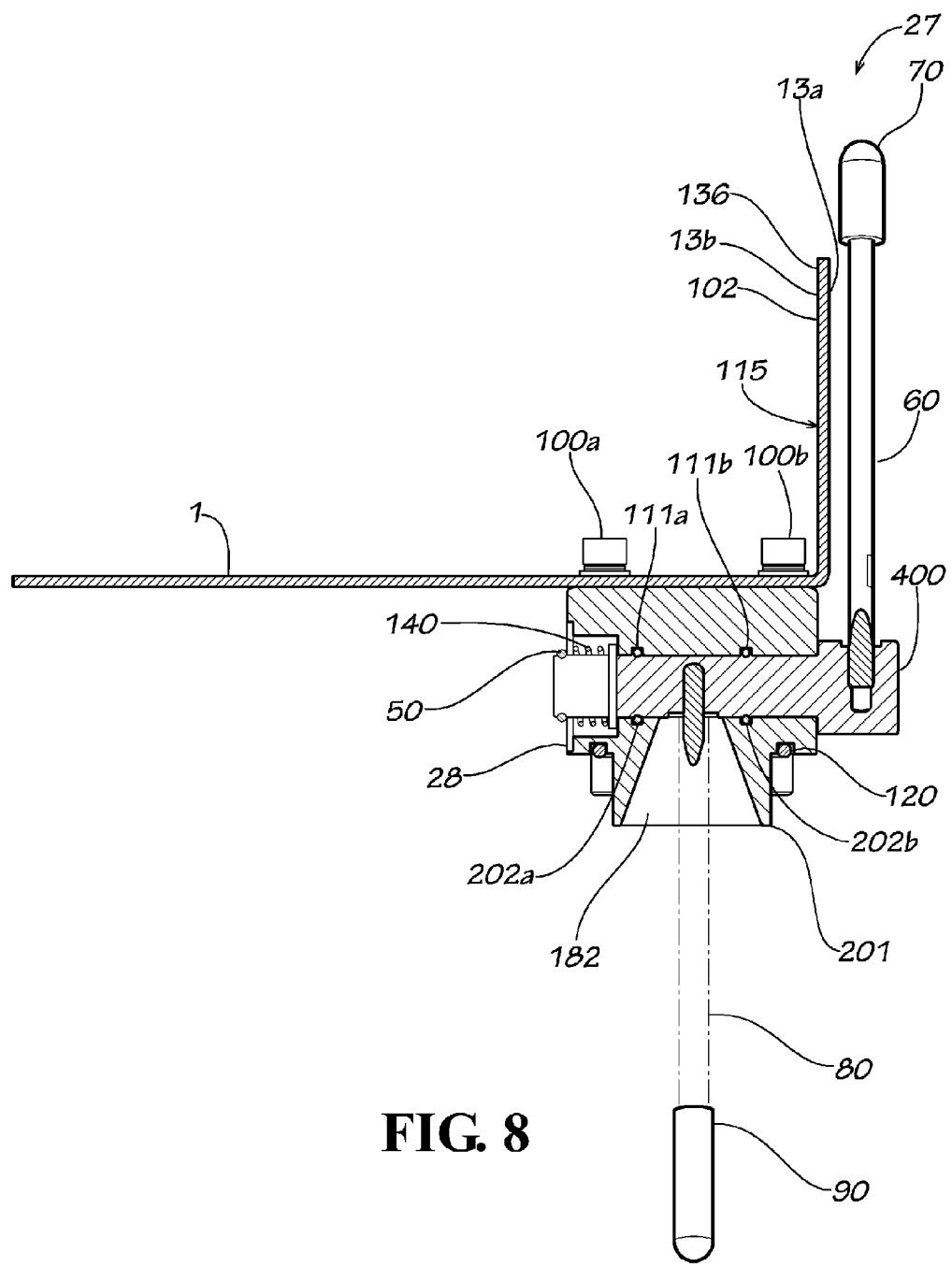
FIG. 8 is a sectional view of a position indicator of the current disclosure.

Referring to FIGS. 7 and 8, the indicator shaft 400 includes a head portion 402, a shank portion 404, and a bias mating slot 405. The indicator shaft 400 also includes an attachment bore 403 for connection of the indicator arm 60.

In the current embodiment, the indicator shaft 400 does not include gasket indentations. Instead, gasket indentations 202a,b are included in the rotation bore 221 of the indicator housing 201. The gasket indentations 202a,b retain the O-rings 111a,b that provide a seal for the indicator assembly 27 when in contact with the media of the valve body 160 as in the position indicator valve 110'.

The mounting bracket 1 includes an attachment portion 114 and a view portion 112. The view portion includes a front surface 113 and a back surface 115. The front indicia member 13a and back indicia member 13b are shown as one unit in the current embodiment. In application, the indicia members 13a,b are adhesive-backed stickers or placards indicating an open and a closed position. The front indicia member 13a and back indicia member 13b are affixed to the front surface 113 and back surface 115, respectively.

The limit switch 14 may be connected to the attachment portion 114 in some embodiments using through-bore bolts 150a,b,c,d and nuts 152a,b,c,d by passing through-bores 155a,b,c,d in the attachment portion 114. The indicator housing 201 is bolted to the valve body 160 by through-bore bolts 100a,b,c,d passing through the bracket bores 105a,b,c,d.

The mounting bracket 1 does not provide a backing to retain the indicator shaft 400 in the rotation bore 221. As such, a retaining plate 28 is included and is placed around the indicator shaft 400 between the snap ring 50 and the torsion spring 140.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment but rather should be construed in breadth and scope in accordance with the appended claims.

We claim:

1. A check valve position indicator assembly comprising:
an indicator housing;
an indicator shaft rotatably disposed in the indicator housing;
an indicator arm attached to the indicator shaft;
a rod attached to the indicator shaft;
a mounting bracket;
an indicia member attached to the mounting bracket;
at least two fasteners connecting the indicator housing with the mounting bracket; and
a biasing element in contact with the indicator shaft, wherein the biasing element is enclosed at least partially within the indicator housing.

2. The assembly of claim 1, further comprising a seal contacting the bottom of the indicator housing.

3. The assembly of claim 2, wherein the seal is an O ring.

4. The assembly of claim 1, further comprising a limit switch mounted on the mounting bracket.

5. The assembly of claim 1, wherein the indicator shaft includes at least one gasket indention.

6. The assembly of claim 1, wherein the indicator housing includes at least one gasket indention.

7. The assembly of claim 1, further comprising at least one O-ring disposed between the indicator housing and the indicator shaft.

8. The assembly of claim 1, wherein the biasing element is a torsion spring.

9. The assembly of claim 1, wherein the indicia member is a plate with indicia corresponding to a position of the indicator arm.

10. The assembly of claim 1, wherein the length of the rod may be changed.

11. The assembly of claim 10, wherein the length of the rod may be changed by connecting a rod of different length to the indicator shaft.

12. A method of determining the position of a flex check valve having a flexible disc and a valve body, the method comprising:
positioning a rod within the valve body that moves when the flexible disc moves, wherein the rod is connected to an indicator arm positioned outside of the valve body through an indicator shaft disposed in an indicator housing such that the movement of the rod is translated to rotational movement of the indicator shaft and of the indicator arm; and securing the rod, indicator arm and indicator shaft relative to the valve body in a predetermined alignment;

wherein the step of positioning the rod within the valve body further comprises positioning the rod adjacent to the flexible disc, wherein the rod is biased against the flexible disc by a biasing element in contact with the indicator shaft, wherein the biasing element is enclosed at least partially within the indicator housing.

13. The method of claim 12, further comprising disposing an indicia member relative to the indicator arm to associate a position of the flex check valve with a position of the indicator arm.

14. A method of installing a mechanical position indicator for a flex check valve having a flexible disc and a valve body, the method comprising:

providing a valve indicator assembly having at least an indicator housing;

providing a shaft in contact with a biasing element, the shaft and biasing element enclosed at least partially within the indicator housing;

determining a distance between the shaft and the flexible disc;

selecting a member having a length substantially equal to the determined distance;

securing the member to the shaft; and securing the valve indicator assembly and member to the valve body.

15. The assembly of claim 1, wherein the biasing element is enclosed entirely within the indicator housing.

16. The method of claim 12, wherein the biasing element is enclosed entirely within the indicator housing.

17. The method of claim 14, wherein the biasing element is enclosed entirely within the indicator housing.

* * * * *